United States Patent [19]
Yoneta et al.

[11] Patent Number: 5,194,955
[45] Date of Patent: Mar. 16, 1993

[54] VIDEO TELEPHONE

[75] Inventors: Hajime Yoneta, Tokyo; Toshio Suzuki; Yasushi Ogino, both of Kanagawa, all of Japan

[73] Assignee: Sony Corporation, Tokyo, Japan

[21] Appl. No.: 701,847

[22] Filed: May 17, 1991

[30] Foreign Application Priority Data

May 19, 1990 [JP] Japan .............................. 2-052351[U]

[51] Int. Cl.⁵ .............................................. H04N 5/30
[52] U.S. Cl. .................................... 358/209; 358/225; 379/53
[58] Field of Search .................... 358/85, 229, 209, 83; 379/53, 158, 202; 354/293

[56] References Cited

U.S. PATENT DOCUMENTS

| | | | |
|---|---|---|---|
| 3,463,879 | 8/1969 | Miyashiro | 358/85 |
| 3,755,623 | 8/1972 | Lassagne | 358/85 |
| 4,674,826 | 6/1987 | Loy | 358/113 |
| 4,821,307 | 4/1989 | Flint | 379/53 |
| 5,012,348 | 4/1991 | Witzel et al. | 358/229 |
| 5,023,725 | 6/1991 | McCutchen | 358/231 |

FOREIGN PATENT DOCUMENTS

| | | |
|---|---|---|
| 3431902 | 3/1984 | European Pat. Off. . |
| 0320787 | 6/1989 | European Pat. Off. . |
| 0408023 | 1/1991 | European Pat. Off. . |
| 3600914 | 7/1987 | Fed. Rep. of Germany . |
| 3613585 | 10/1987 | Fed. Rep. of Germany . |
| 62-280817 | 12/1987 | Japan . |
| 63-191120 | 8/1988 | Japan . |
| 63-252084 | 10/1988 | Japan . |
| 2-39690 | 2/1990 | Japan . |

Primary Examiner—Michael T. Razavi
Assistant Examiner—Tuan V. Ho
Attorney, Agent, or Firm—Hill, Steadman & Simpson

[57] ABSTRACT

In a video telephone in which images of telephoners as well as writings or drawings are alternately formed and transmitted, a single video camera is fixed and the optical axis extending from the video camera is optionally changed to select one of two directions, so that it is possible to form the images alternately of the telephoners and of the writings or drawings.

3 Claims, 4 Drawing Sheets

VIDEO TELEPHONE

BACKGROUND OF THE INVENTION

1. Field of the Invention

This invention relates to a video telephone in which images of telephoners as well as writings or drawings are alternately formed and transmitted.

2. Description of the Related Art

A well known type of video telephone disclosed in Japanese Laid Open Patent No. 61-179690 comprises a video camera and a monitoring display. Images of a telephoner are formed in the video camera and sent to another monitoring display of a telephonee, and images of the telephonee are given by the monitoring display of the telephoner.

Recently, a video telephone shown in FIG. 4 was disclosed, in which the images of the telephoner A as well as the writing or drawing B are alternately formed in a single video camera 3 and transmitted.

Provided on one side of a display stand 7 is a camera stand 15, on a top of which a pivot 16 is secured for a support arm 17 to be turned horizontally on the pivot 16, and further, a video camera 3 is secured to be turned vertically on another pivot 18, which is secured to the distal end of the arm 17.

To form the image of the telephoner A in the video camera 3, the video camera 3 is turned above a display 6 to become parallel to a direction indicated by arrow a, and positioned as indicated in solid lines in FIG. 4. When the image of the writing or drawing B is formed, the arm 17 is turned through an angle of 180° in a direction of arrow b on the pivot 16 as indicated in chain-dotted lines in FIG. 4, and then, the video camera 3 is turned through an angle of 90° in a direction of arrow c on the pivot 18 to become parallel to a direction indicated by arrow d. Thus, the image of the writing or drawing 8 is to be formed in the video camera 3.

However, in the video telephone shown in FIG. 4, the video camera 3 is required to travel rather a large distance between two positions where the images of the telephoner A and the writing or drawing B are formed, respectively. In addition, in the course of the travel, the video camera 3 is turned two times on the pivots 16 and 18.

Thus, the telephoner A is inconvenienced by moving the video camera 3 in order to take pictures alternately of himself A and of the writing or drawing B during telephoning, which wastes his time.

Moreover, a mechanism for moving the video camera 3, which comprises the support arm 17 and the two pivots 16 and 18, is complicated in structure, is rather expensive for manufacturing, and requires a large space for the support arm 17 to travel. In addition, movable portions, such as the pair of pivots 16 and 18 are apt to often break down, and also, the video camera itself is apt to break down because of being frequently moved.

OBJECTS AND SUMMARY OF THE INVENTION

Accordingly, it is an object of the present invention to provide a video telephone in which a video camera is fixed in a predetermined position so as to improve its endurance, and nevertheless, it can simply be operated so as to take pictures alternately of a telephoner and of a writing or drawing.

Another object of the invention is to provide a video telephone in which it is possible to transmit images of writings or drawings instead of images of a telephoner by inserting reflection means which pass through the axis of an optical system between an optical means and a video camera, so that the writings or drawings are immediately transmitted during telephoning without moving the video camera.

A further object of the invention is to provide a video telephone in which reflection means optionally are inserted so as to pass through the axis of an optical system between an optical means and a video camera and which, is made simpler in structure, for example, than a moving mechanism for the video camera, which is complicated in structure and which is, replaced by a rotating mechanism for a reflection mirror, which is simpler in structure, so that it is possible to reduce the production costs of the video telephone, to make the video telephone compact because because a large space is not required for moving the video camera, and serious drawbacks in the video telephone do not occur because the movable parts of the video telephone are reduced.

Still a further object of the invention is to provide a video telephone in which a telephoner and a telephonee can converse with each other as they face each other with their eyelines coincident with each other.

In accordance with an aspect of this invention, a video telephone comprises optical means through which the axis of an optical system passes, and which can reflect part of the light rays and transmit part; a video camera arranged on the light-rays transmission side of the optical means; a display arranged on the light-rays reflection side of the optical means; and reflection means optionally inserted between the optical means and the video camera so that images of writings or drawings may be formed in the video camera after being reflected by the reflection means.

Thus, when the eyeline of a telephoner coincides with the axis of the optical system of the video telephone, predetermined images of the telephoner are formed in the video camera and, at the same time, the telephoner can watch a telephonee's images in the display.

Moreover, if the reflection means is inserted between the optical means and the video camera under the above-described conditions, images of the writings or drawings are formed in the video camera without any other operation.

In a preferred embodiment of this invention, the reflection means is initiated by an actuator. Mirror images formed in the video camera are electrically inverted before image signals are transmitted, or mirror images are inverted due to automatic actuation of a switch which is interlocked with the inserting operation of the reflection means.

Moreover, a plane mirror, a concave mirror or a convex mirror is used as the reflection means. The cabinet of the video telephone is put on a stand, the base plate of which has a recess for receiving the writings or drawings therein, so that the writings or drawings can be set within a projective area of the cabinet.

The above, and other objects, features and advantages of this invention, will be apparent from the following detailed description of an embodiment thereof to be read in connection with the accompanying drawings, wherein like reference numerals identify the same or corresponding parts in the several views.

DETAILED DESCRIPTION OF A PREFERRED EMBODIMENT

Figure 1:
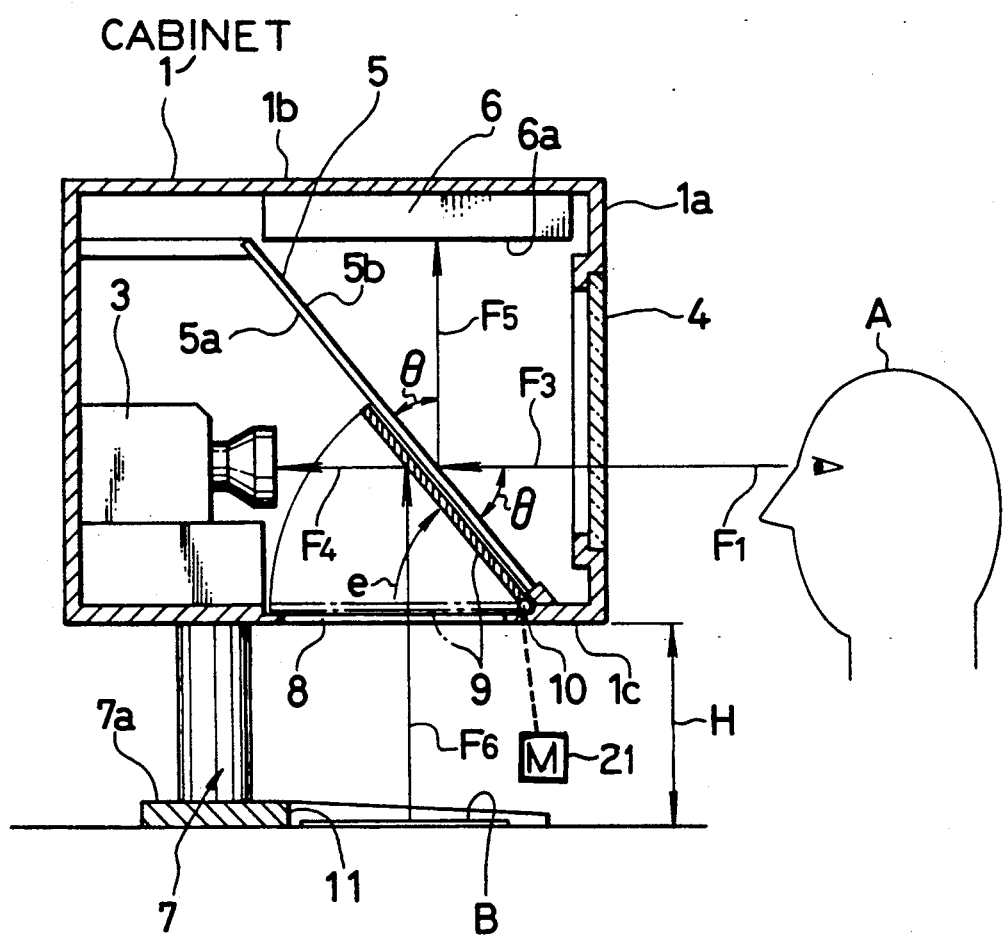
FIG. 1 is a sectional view of a video telephone at a time of taking pictures of writings or drawings according to an embodiment of this invention.

Referring initially to FIG. 1, it will be seen that a transparent plate glass 4 is vertically secured to a front side 1a of a cabinet 1, and provided within the cabinet 1 are a beam splitter 5, such as a half mirror, a video camera 3 and a liquid crystal display (LCD) 6.

The axis $F_3$ of an optical system passes through the plate glass 4 and the beam splitter 5. The axis $F_3$ forms a right angle or a predetermined angle with the plate glass 4, and forms a predetermined angle $\theta$ of 45° for example, with the beam splitter 5.

The video camera 3 is arranged on the light-rays transmission side, that is, on the back side 5a of the beam splitter 5, and the optical axis $F_4$ of the video camera 3 coincides with the axis $F_3$.

The LCD 6 provided on the front side 5b of the beam splitter 5 is arranged over the beam splitter 5 for the front surface 6a of the LCD 6 which face toward the bottom 1c of the cabinet 1. Further, the front surface 6a is perpendicular to an axis $F_5$ having the angle $\theta$ with the beam splitter 5 which branches off from the axis $F_3$ on the front-side surface of the beam splitter 5.

The cabinet 1 is held by a stand 7 at a predetermined height H, and an opening 8 is disposed in the bottom 1c of the cabinet 1. A reflection mirror 9 is secured to the bottom 1c by hinges 10 so as to be swingable in a direction of arrows e and f within a triangular space which is formed by the bottom 1c and the beam splitter 5. It is noted that the reflection mirror 9 serves also as a lid of the opening 8. A motor 21 may be connected to the mirror 9 to move it to closed and open positions.

The stand 7 has a recess 11 in the base plate 7a thereof. The recess 11 is arranged directly under the opening 8, and writings or drawings B are set within the recess 11.

Figure 2:
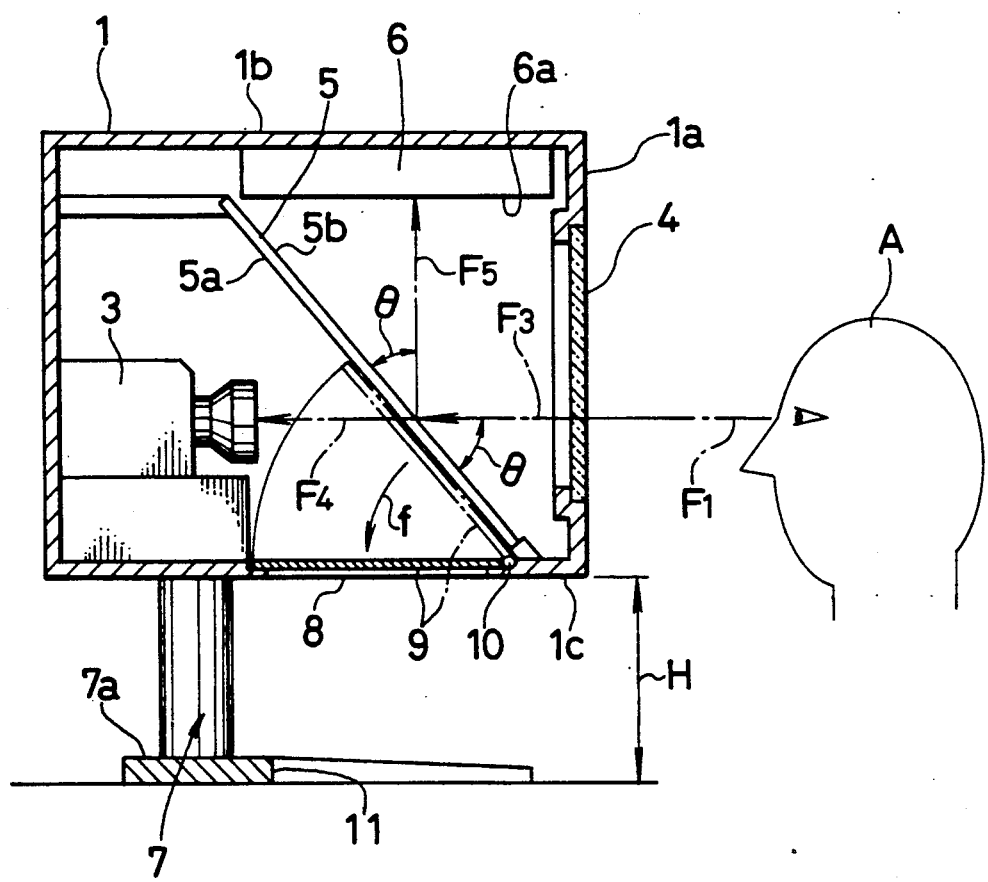
FIG. 2 is a sectional view of the video telephone of FIG. 1 at a time of taking pictures of a telephoner.

A function of the above video telephone will be hereinafter described. To send images of the telephoner A to a telephonee's video telephone during telephoning, the reflection mirror 9 is rotated through an angle of 45° in the direction of arrow f in FIG. 2 to a position which is horizontal and which closes the opening 8. the opening 8.

When the eyeline $F_1$ of the telephoner A is made to coincide with the axis $F_3$ of the optical system, a predetermined image of the telephoner A is formed in the video camera 3 and, at the same time, the telephoner A can see the front surface 6a of the LCD 6. Thus, the telephoner and the telephonee can converse with each other by telephone, watching the images in the front surface 6a of the LCD 6.

Figure 3:
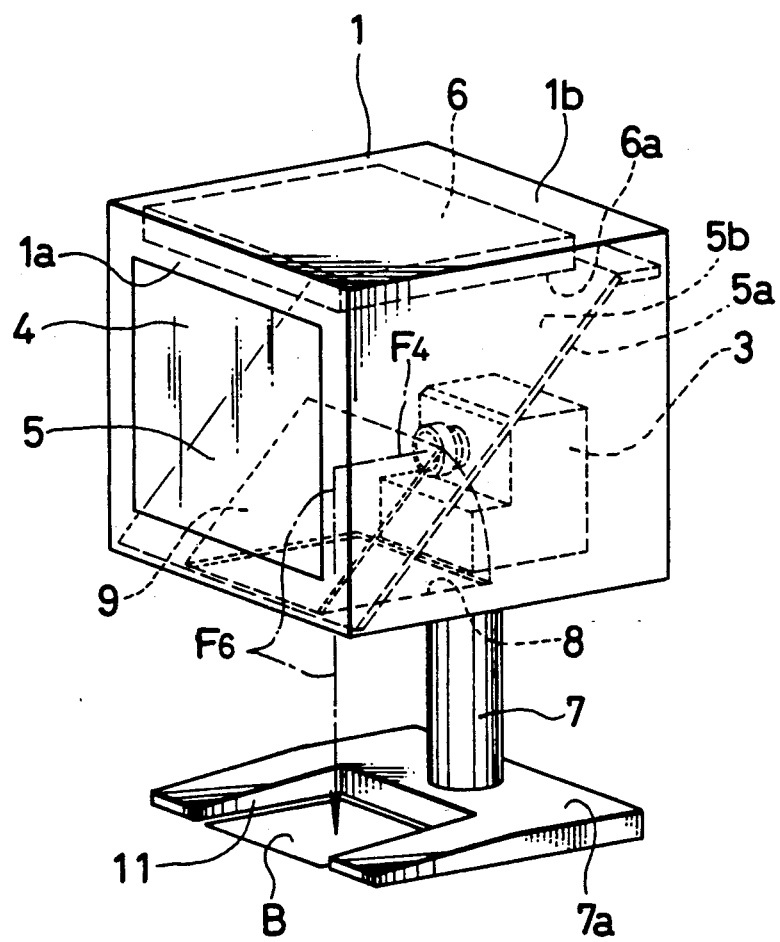
FIG. 3 is an overall, perspective view of the video telephone of FIG. 1.
Figure 4:
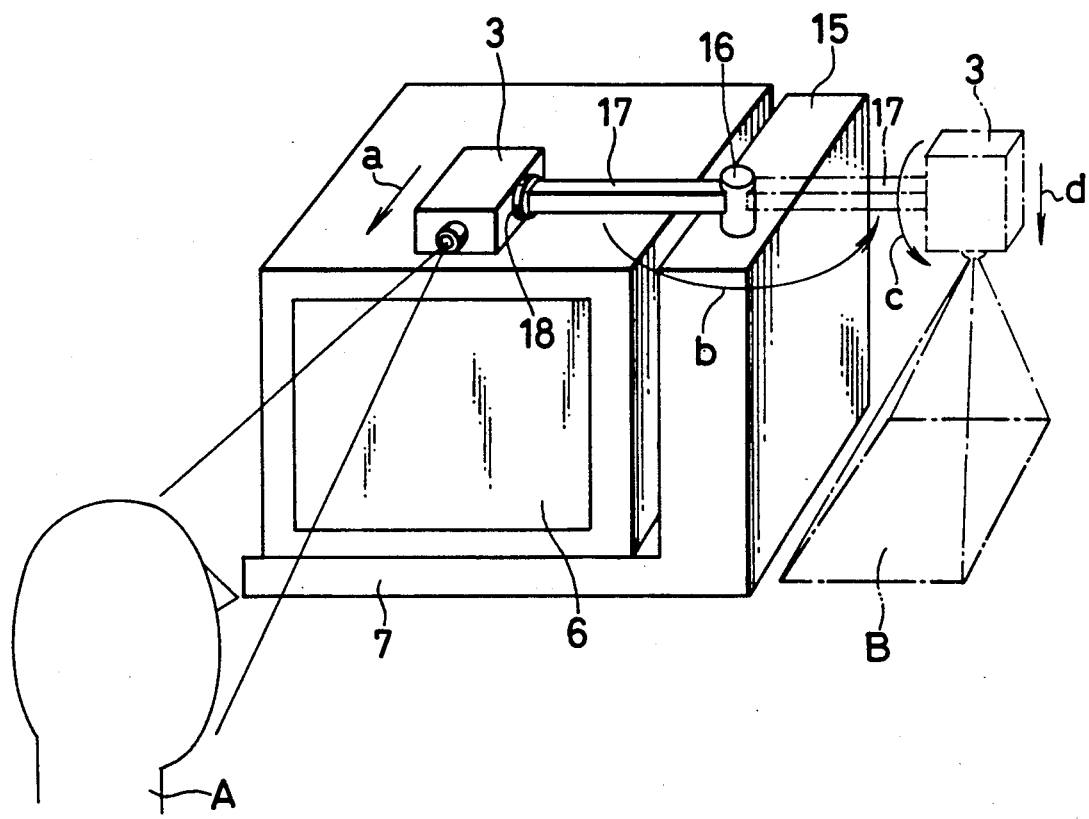
FIG. 4, is a perspective view of a previously proposed video telephone.

In the meanwhile, if the telephoner A wishes to transmit images of the writing or drawing B during his conversation, he may turn the reflection mirror 9 in the direction of arrow e as shown in FIGS. 1 and 3, and overlap the mirror 9 on the back side 5a of the beam splitter 5 so that the mirror 9 is inserted between the beam splitter 5 and the video camera 3. It is noted that at that time, the opening 8 is open.

Thus, light rays reflecting from the writing or drawing B which has been set in the recess 11 of the stand 7, and travel along an axis $F_6$ shown in FIG. 1 and are reflected by the reflection mirror 9 and travel toward the video camera 3 along the optical axis $F_4$, so that the images of the writing or drawing B are formed in the video camera 3.

According to the video telephone of this invention, the images of the writing or drawing can be formed in the video camera 3 merely by inserting the reflection mirror 9 between the beam splitter 5 and the video camera 3 during telephoning. In other words, even though the video camera 3 is fixed, the telephoner A can optionally transmit the images alternately of himself and the writing or drawing B.

The reflection mirror 9 may be turned manually or by a motor. Since the image of the writing or drawing B formed in the video camera 3 is an mirror image, it is preferable for the mirror image to be electrically inverted, for example, due to the automatic actuation of a switch that is interlocked with the rotation of the reflection mirror 9, before the image signals are transmitted.

Moreover, if a concave mirror is used as the reflection mirror 9, it is possible to vary the image size of the writing or drawing B, and if a convex mirror is used as the reflection mirror 9, it is possible to widen the image of the writing or drawing B during picture-taking.

In addition, the writing or drawing B can be set within a projective area of the cabinet 1 because of the recess 11 for setting the writing or drawing B within the base plate 7a of the stand 7 just under the opening 8, so that there is no need of any other space for setting the writing or drawing B, and thus, it is possible to make the video telephone compact.

Having described illustrative embodiments of this invention with reference to the accompanying drawings, it is to be understood that the invention is not limited to that precise embodiments, and that various changes and modifications may be effected therein by one skilled in the art without departing from the scope or sprit of the invention as defined in the appended claims.

What is claimed is:

1. A video system for use with a telephone comprising, a hollow cabinet, a transparent glass plate mounted in the front vertical side of said cabinet, a beam splitter such as a half mirror mounted in said cabinet behind said transparent glass plate, a video camera mounted in said cabinet so as to receive light rays on a straight path from scenes outside said cabinet through said transparent glass plate and said beam splitter, a liquid crystal display mounted in said cabinet so that it can be viewed through said transparent glass plate and said beam splitter by reflecting images from the display, an opening formed in the bottom of said cabinet below said beam splitter, said cabinet supported on a stand, a document holder formed on said stand below said opening formed in the bottom of said cabinet, and a mirror pivotally connected to said cabinet and manually or automatically moveable to a first position so that it forms a cover for said opening and manually or automatically moveable to a second position such that it uncovers said opening and reflects an image of a document on said document holder to said video camera so only the document or the face is detected.

2. A video system for use with a telephone according to claim 1 wherein said mirror can be manually moved from first to said second position.

3. A video system for use with a telephone according to claim 1 including a motor means attached to said mirror to move it from said first to said second position.

* * * * *